(12) United States Patent
Nakatake et al.

(10) Patent No.: US 8,770,052 B2
(45) Date of Patent: Jul. 8, 2014

(54) LINEAR ACTUATOR

(75) Inventors: Koji Nakatake, Nagano (JP); Kazuyuki Kitazawa, Nagano (JP); Shigenori Miyairi, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 385 days.

(21) Appl. No.: 12/965,043

(22) Filed: Dec. 10, 2010

(65) Prior Publication Data

US 2011/0138947 A1    Jun. 16, 2011

(30) Foreign Application Priority Data

Dec. 11, 2009 (JP) ................. 2009-281592

(51) Int. Cl.
*F16H 29/00* (2006.01)
*F16H 25/20* (2006.01)
*F16H 25/22* (2006.01)

(52) U.S. Cl.
USPC ...... 74/89.42; 74/89.23; 74/89.34; 74/424.82

(58) Field of Classification Search
USPC ......... 74/89.23, 89.34, 89.42, 424.81–424.84
See application file for complete search history.

(56) References Cited

U.S. PATENT DOCUMENTS

| | | | | |
|---|---|---|---|---|
| 3,402,308 | A | * | 9/1968 | Henschke .................. 310/80 |
| 3,660,704 | A | * | 5/1972 | Paine et al. ................ 310/80 |
| 4,074,585 | A | * | 2/1978 | Richaud et al. ........... 74/424.87 |
| 5,099,161 | A | * | 3/1992 | Wolfbauer, III ............ 310/80 |

FOREIGN PATENT DOCUMENTS

| | | |
|---|---|---|
| EP | 2333380 | 6/2011 |
| JP | 03-159538 | 7/1991 |
| JP | 2000-220715 | 8/2000 |
| JP | 2002-372117 | 12/2002 |
| JP | 2002-372118 | 12/2002 |
| JP | 2007-032596 | 2/2007 |
| JP | 2007239782 A * | 9/2007 |
| JP | 4251789 | 4/2009 |

OTHER PUBLICATIONS

Chinese Office Action with English translation dated Nov. 12, 2013, 10 pages.
Japanese Office Action and English translation dated Oct. 1, 2013, 6 pages.

* cited by examiner

*Primary Examiner* — Troy Chambers
*Assistant Examiner* — Emily Cheng
(74) *Attorney, Agent, or Firm* — Rankin, Hill & Clark LLP

(57) ABSTRACT

A linear actuator that does not require a high assembly precision is provided. A linear actuator includes a motor portion including a rotary shaft, a rotor, and a stator, a first bearing portion that supports a first end of the rotary shaft, a locknut threadably engaged on the first end of the rotary shaft, and a ball screw mechanism including a ball screw nut screwed to the locknut and a ball screw threadably engaged with the ball screw nut. Gaps formed between an outer peripheral portion of the rotary shaft and an inner peripheral portion of the locknut, except a male thread portion formed on the rotary shaft and a female thread portion formed on the locknut threadably engaged with each other, are defined to have respective predetermined sizes.

4 Claims, 4 Drawing Sheets

LINEAR ACTUATOR

TECHNICAL FIELD

The present invention relates to a linear actuator that converts a rotational motion into a linear motion.

BACKGROUND ART

A linear actuator disclosed in Japanese Patent Application Publication No. 2002-372118 (JP2002-372118A) and Japanese Patent No. 4251789 (JP4251789) includes a hollow rotary shaft 103, 203 that is rotatable along with rotational motion of a motor, a ball screw nut 115, 215 fixed to the rotary shaft 103, 203, and a ball screw 117, 217 threadably engaged with the ball screw nut 115, 215. Rotational motion of the rotary shaft 103, 203 causes the ball screw 117, 217 serving as an output shaft to make linear motion in the axial direction of the rotary shaft 103, 203. In each of the linear actuators, the ball screw nut 115, 215 is screwed to a locknut 113, 213 threadably engaged with a thread portion 121, 221 provided on an outer peripheral portion of the rotary shaft 103, 203 so that the ball screw nut 115, 215 is fixed to the rotary shaft 103, 203 (see FIGS. 3 and 4). In the linear actuator disclosed in Japanese Patent No. 4251789 shown in FIG. 4, in particular, a gap 244 is formed between a flange portion 215B of the ball screw nut 215 and the locknut 213 with an end 203A of the rotary shaft 203 contacting the ball screw nut 215, as a result of which a tightening force for screwing the ball screw nut 215 and the locknut 213 reinforces fixation between the ball screw nut 215 and the locknut 213.

In the linear actuators according to the related art, however, the locknut for fixing the ball screw nut to the rotary shaft is threadably fixed to the outer peripheral portion of the rotary shaft, and therefore backlash or center displacement (displacement between the centers of rotation of two members) tends to occur between the outer peripheral portion of the rotary shaft and the inner peripheral portion of the locknut. Therefore, if the assembly precision is not improved in the linear actuators according to the related art, displacement may occur between the center of rotation of the rotary shaft and the center of rotation of the ball screw, which may cause the center of rotation of the ball screw to be inclined with respect to the axis of the rotary shaft.

In the linear actuators according to the related art, the ball screw nut is fixed to the locknut using a plurality of screws with an end of the rotary shaft contacting the ball screw nut. Therefore, if the ball screw nut is fixed to the locknut using the plurality of screw members and accordingly screw tightening force is large, the end of the rotary shaft may be deformed or damaged.

SUMMARY OF THE INVENTION

An object of the present invention is to provide a linear actuator that does not require a high assembly precision.

Another object of the present invention is to provide a linear actuator in which an end of a rotary shaft can be prevented from being deformed or damaged.

A linear actuator according to the present invention includes a motor portion, first and second bearing portions, a locknut, and a ball screw mechanism. The motor portion includes a cylindrical rotary shaft having a first end and a second end and including an opening portion at least at the first end in an axial direction of the rotary shaft, a rotor fixed to the rotary shaft, and a stator disposed outside the rotor. A motor known in the art such as a stepping motor or a servo motor may be used as the motor portion.

The first bearing portion is configured to rotatably support the first end of the rotary shaft. The second bearing portion is configured to rotatably support the second end of the rotary shaft.

The locknut is threadably engaged on the first end of the rotary shaft, and contacts an inner race of the first bearing portion to block movement of the inner race of the first bearing portion in the axial direction.

The ball screw mechanism includes a ball screw nut and a ball screw. The ball screw nut includes a nut body fitted in the opening portion of the rotary shaft, and a flange portion integrally formed with the nut body and located outside the opening portion. The ball screw nut is screwed to the locknut using a plurality of screw members with the flange portion contacting the locknut. The ball screw is threadably engaged with the ball screw nut with part of the ball screw extending in the rotary shaft.

In the linear actuator according to the present invention, a male thread portion is formed on an outer peripheral portion of the first end of the rotary shaft to be threadably engaged with the locknut. A female thread portion is formed on an inner peripheral portion of the locknut to be threadably engaged with the male thread portion of the rotary shaft. Gaps formed between the outer peripheral portion of the rotary shaft and the inner wall portion of the locknut, except the male thread portion of the rotary shaft and the female thread portion of the locknut threadably engaged with each other, are defined in size to prevent displacement between the center of rotation of the rotary shaft, the center of rotation of the locknut, and the center of rotation of the ball screw nut when the ball screw nut is fixed to the locknut using the plurality of screw members. With this configuration, displacement between the center of rotation of the rotary shaft and the center of rotation of the locknut is prevented in a work process for threadably engaging the locknut with the rotary shaft, with the outer peripheral portion of the rotary shaft and the inner wall portion of the locknut, except the male thread portion of the rotary shaft and the female thread portion of the locknut, serving as guides or features for engagement. Since the flange portion of the ball screw nut is fixed to the locknut using the plurality of screw members with the flange portion of the ball screw nut contacting the locknut, displacement between the center of rotation of the locknut and the center of rotation of the ball screw nut can be prevented. Thus, according to the present invention, it is possible to prevent the center of rotation of the ball screw from being inclined with respect to the axis of the rotary shaft without requiring particularly high assembly precision.

As a matter of course, the linear actuator includes a casing assembly. Preferably, the casing assembly forms part of the casing for the motor portion and the ball screw mechanism, and includes a first end bracket and a second end bracket, for example. The first end bracket may be configured to fix the first bearing portion and allow the ball screw to move in an axial direction of the rotary shaft. The second end bracket may be configured to fix the second bearing portion and allow the second end of the rotary shaft to rotatably project from the second end bracket. The first and second end brackets may face each other in the axial direction.

In the linear actuator according to the present invention, preferably, a first cylindrical outer peripheral surface portion and a second cylindrical outer peripheral surface portion are formed on the outer peripheral portion at the first end of the rotary shaft in addition to the male thread portion discussed above. The male thread portion is threadably engaged with the female thread portion of the locknut. The first cylindrical outer peripheral surface portion is located closer to the second bearing portion than the male thread portion is. The second cylindrical outer peripheral surface portion is smaller in diameter than the first cylindrical outer peripheral surface portion, and located opposite the first cylindrical outer peripheral surface portion across the male thread portion. Preferably, a first cylindrical inner peripheral surface portion and a second cylindrical inner peripheral surface portion are formed on the inner peripheral portion of the locknut in addition to the female thread portion. The female thread portion is threadably engaged with the male thread portion of the rotary shaft. The first cylindrical inner peripheral surface portion faces the first cylindrical outer peripheral surface portion with the male thread portion and the female thread portion threadably engaged with each other. The second cylindrical inner peripheral surface portion is smaller in diameter than the first cylindrical inner peripheral surface portion, and faces the second cylindrical outer peripheral surface portion with the male thread portion and the female thread portion threadably engaged with each other. The gap formed between the first cylindrical outer peripheral surface portion and the first cylindrical inner peripheral surface portion and the gap formed between the second cylindrical outer peripheral surface portion and the second cylindrical inner peripheral surface portion are each defined in size to prevent displacement between the center of rotation of the rotary shaft, the center of rotation of the locknut, and the center of rotation of the ball screw nut when the ball screw nut is fixed to the locknut using the plurality of screw members.

When the two gaps formed between the outer peripheral surface of the rotary shaft and the inner peripheral surface of the locknut and arranged in the axial direction of the rotary shaft across the male thread portion and the female thread portion threadably engaged with each other are each defined in size to prevent displacement between the respective centers of rotation of the rotary shaft, the locknut, and the ball screw as described above, the ball screw can be reliably moved linearly with no displacement between the axis of the rotary shaft and the center of rotation of the ball screw.

In the linear actuator according to the present invention, a gap may be formed between the first end of the rotary shaft and the flange portion of the ball screw nut since the flange portion of the ball screw nut is fixed to the locknut while contacting the locknut. Such a gap can prevent the first end of the rotary shaft from being deformed or damaged by tightening the ball screw nut, since the ball screw nut does not contact the first end of the rotary shaft, in screwing the ball screw nut to the locknut. This results in facilitated assembly of a linear actuator in which the ball screw reliably moves linearly with no displacement between the axis of the rotary shaft and the center of rotation of the ball screw.

DESCRIPTION OF THE PREFERRED EMBODIMENTS

Figure 1:
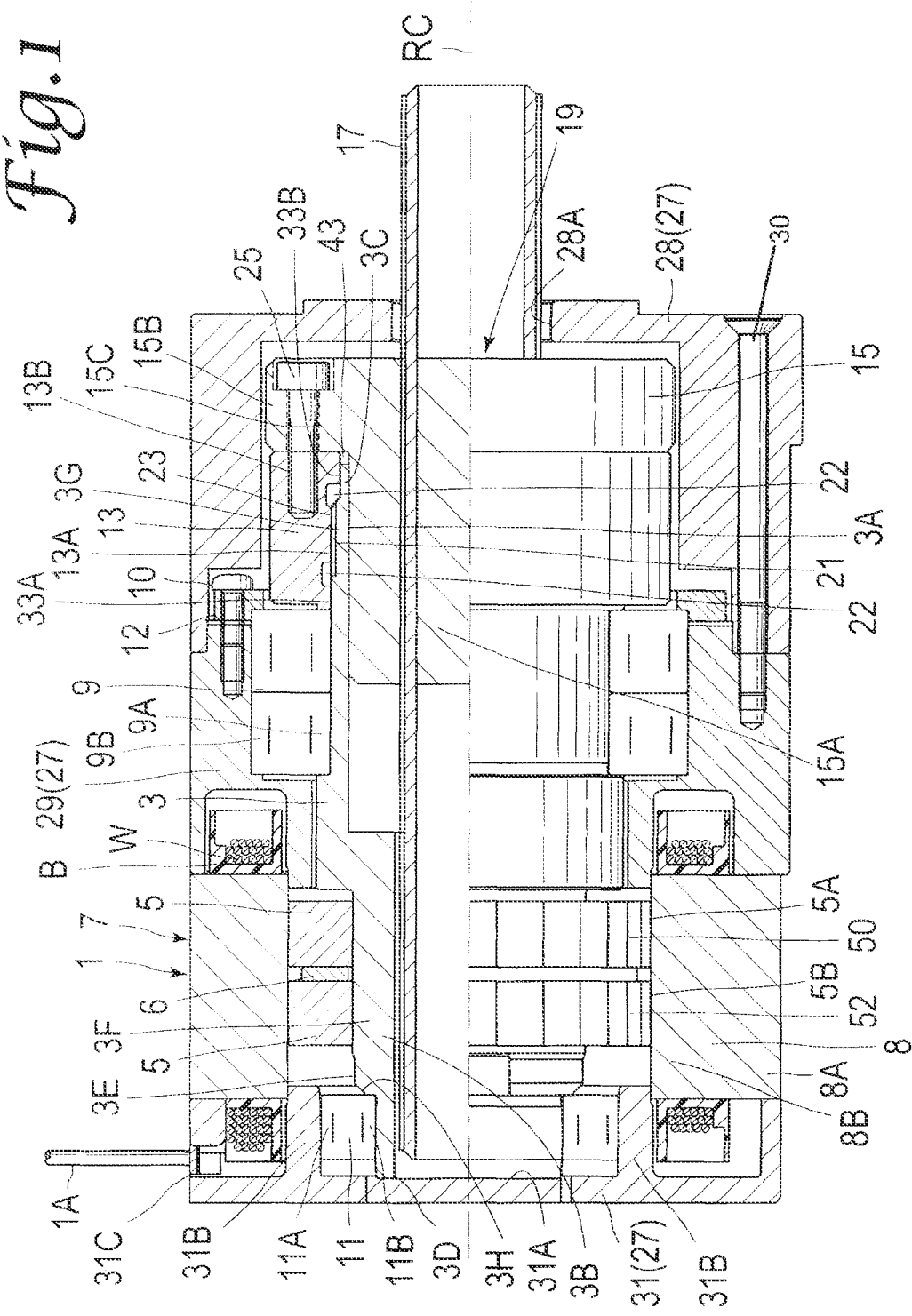
FIG. 1 is a cross-sectional view of a linear actuator according to an embodiment of the present invention.

A linear actuator according to an embodiment of the present invention will be described below. FIG. 1 is a cross-sectional view of a linear actuator according to an embodiment of the present invention. In FIG. 1, a rotary shaft, a rotor portion, a locknut, a ball screw nut, etc. are partially shown in cross section. In FIG. 1, reference numeral 1 denotes a motor portion formed by a stepping motor. The motor portion 1 includes a rotary shaft 3, rotors 5, and a stator 7. The rotary shaft 3 has a cylindrical shape with both ends (a first end 3A and a second end 3B) opening to respectively form opening portions 3C and 3D. The rotary shaft 3 has an inner diameter allowing a ball screw 17 to be discussed later to reciprocally move inside the rotary shaft 3 along the axis of the rotary shaft 3. A small diameter portion 3F and a large diameter portion 3G are provided on an outer peripheral portion 3E of the rotary shaft 3. The small diameter portion 3F is provided for fixation of the rotors 5. The large diameter portion 3G has a diameter larger than the diameter of the small diameter portion 3F, and is configured to receive a nut body 15A of a ball screw nut 15 which will be discussed later. Two rotors 5 are fixed to the outer peripheral portion 3E of the rotary shaft 3. The stator 7 is disposed on the radially outside the rotors 5. In the embodiment, a hybrid stepping motor known in the art is used as the motor portion 1. The hybrid stepping motor includes two rotor stacks 5A and 5B respectively formed with a plurality of small teeth 50 and 52 disposed on their outer peripheries at a predetermined angular pitch, and a permanent magnet 6 disposed between the two rotor stacks 5A and 5B. The permanent magnet 6 is magnetized in the thickness direction such that magnetic poles with different polarities appear in the plurality of small teeth 50 and 52. A stator core 8 of the stator 7 has a plurality of magnetic pole portions 8B disposed on the inner periphery of a yoke 8A at equal intervals, and a bobbin B provided with a winding portion W is mounted on each of the magnetic pole portions 8B. A plurality of small teeth, not shown, are formed on magnetic pole surfaces of the plurality of magnetic pole portions 8B.

An inner race 9A of an annular thrust bearing 9 serving as a first bearing portion is fixed to the outer peripheral portion of the large diameter portion 3G at the first end 3A of the rotary shaft 3. An outer race 9B of the thrust bearing 9 is fitted in a first end bracket 29 forming part of a casing 27 which will be discussed later. A ring member 12 fixed to the first end bracket 29 using a screw 10 prevents the thrust bearing 9 from slipping off. The thrust bearing 9 rotatably supports the first end 3A of the rotary shaft 3 such that the rotary shaft 3 does not move in the axial direction or thrust direction.

A ball bearing 11 serving as a second bearing portion is provided on the outer peripheral portion 3E of the small diameter portion 3F at the second end 3B of the rotary shaft 3. An outer race 11A of the ball bearing 11 is fitted in a second end bracket 31, and an inner race 11B of the ball bearing 11 is fitted on the second end 3B of the rotary shaft 3. A stepped portion 3H for bearing positioning is formed at the second end 3B of the rotary shaft 3.

A locknut 13 is threadably engaged on an extended portion of the first end 3A of the rotary shaft 3 projecting form the thrust bearing 9 in the axial direction. Specifically, a male thread portion 21 is formed on the outer peripheral portion of the large diameter portion 3G at the first end 3A of the rotary shaft 3. A female thread portion 23 is formed on an inner peripheral portion 13A of the locknut 13. The locknut 13 is threadably engaged with the rotary shaft 3 by threadably engaging the male thread portion 21 of the rotary shaft 3 with the female thread portion 23 of the locknut 13. With the locknut 13 threadably engaged with the rotary shaft 3, two screws are fitted into through holes, not shown, formed in the locknut 13 and screwed into screw holes, not shown, formed in the outer peripheral portion of the large diameter portion 3G of the rotary shaft 3 to fix the locknut 13 to the rotary shaft 3. Two annular grooves 22 are formed in the inner peripheral portion of the locknut 13 at positions corresponding to heads of the two screws, not shown, to prevent the heads of the screws from becoming obstacles. The locknut 13 contacts the inner race 9A of the thrust bearing 9 or a first bearing portion to block movement of the inner race 9A of the thrust bearing 9 in the axial direction. The threadable engagement between the rotary shaft 3 and the locknut 13 will be described in detail later.

A ball screw nut 15 is fixed to the first end 3A of the rotary shaft 3. The ball screw nut 15 includes a nut body 15A fitted in the opening portion 3C of the rotary shaft 3, and a flange portion 15B integrally provided with the nut body 15A and located outside the opening portion 3C. With the flange portion 15B contacting the locknut 13, the ball screw nut 15 is screwed to the locknut 13 using four screws 25 or screw members disposed at intervals in the circumferential direction. The four screws 25 are fitted into through holes 15C formed in the flange portion 15B of the ball screw nut 15 at equal intervals and screwed into screw holes 13B formed in the locknut 13 at equal intervals in correspondence with the through holes 15C to fix the ball screw nut 15 to the locknut 13. The ball screw 17 is threadably engaged with the ball screw nut 15 with part of the ball screw 17 extending in the rotary shaft 3. The ball screw nut 15 and the ball screw 17 form a ball screw mechanism 19. An end cover 28 for covering the locknut 13, the ball screw nut 15, and part of the ball screw 17 are fixed to the first end bracket 29. The end cover 28 is located on the first end 3A side of the rotary shaft 3 in the axial direction of the rotary shaft 3 to surround the ball screw mechanism 19, and formed with a through hole 28A allowing movement of the ball screw 17 in the axial direction. The end cover 28 is fixed at four corners of the first end bracket 29 using four screws 30. In the linear actuator according to the embodiment, the motor portion 1 and the ball screw mechanism 19 are housed in a casing assembly or casing 27. The casing assembly includes the end cover 28, the first end bracket 29, the second end bracket 31, the ring member 12, and the stator core 8A of the stator 7.

The ball bearing 11 forming the second bearing portion is fitted in the second end bracket 31. Specifically, the ball bearing 11 is fitted in a cylindrical portion 31B integrally formed with an inner wall portion 31A of the second end bracket 31. A through hole 31C is formed in a side wall portion 31D of the second end bracket 31. The through hole 31C allows a lead wire 1A, which is connected to the motor portion 1 to supply electricity to the motor portion 1, to be led out to the outside.

Figure 2:
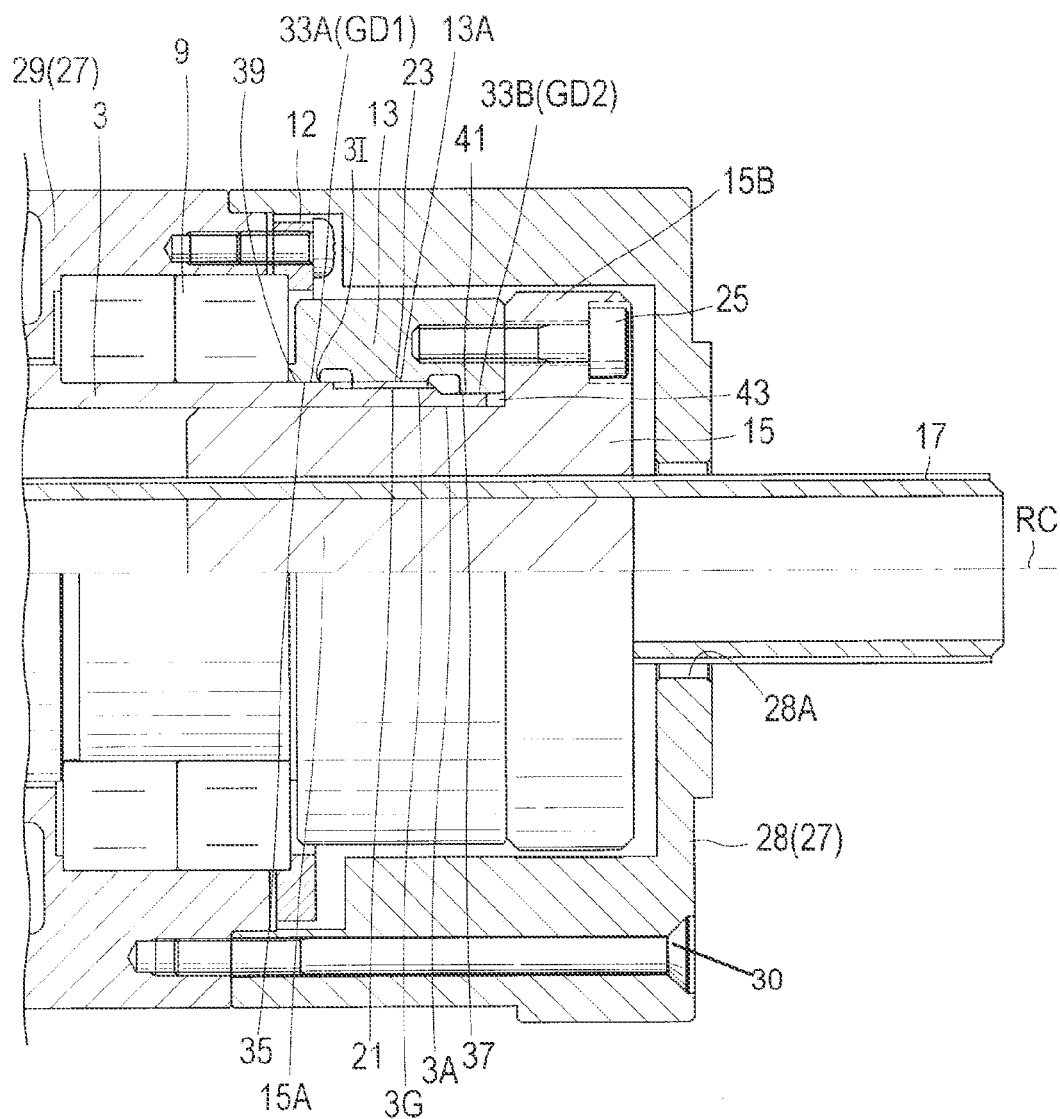
FIG. 2 is an enlarged view showing part of the linear actuator of FIG. 1 showing a portion where a ball screw mechanism is attached to a first end of a rotary shaft.
Figure 3:
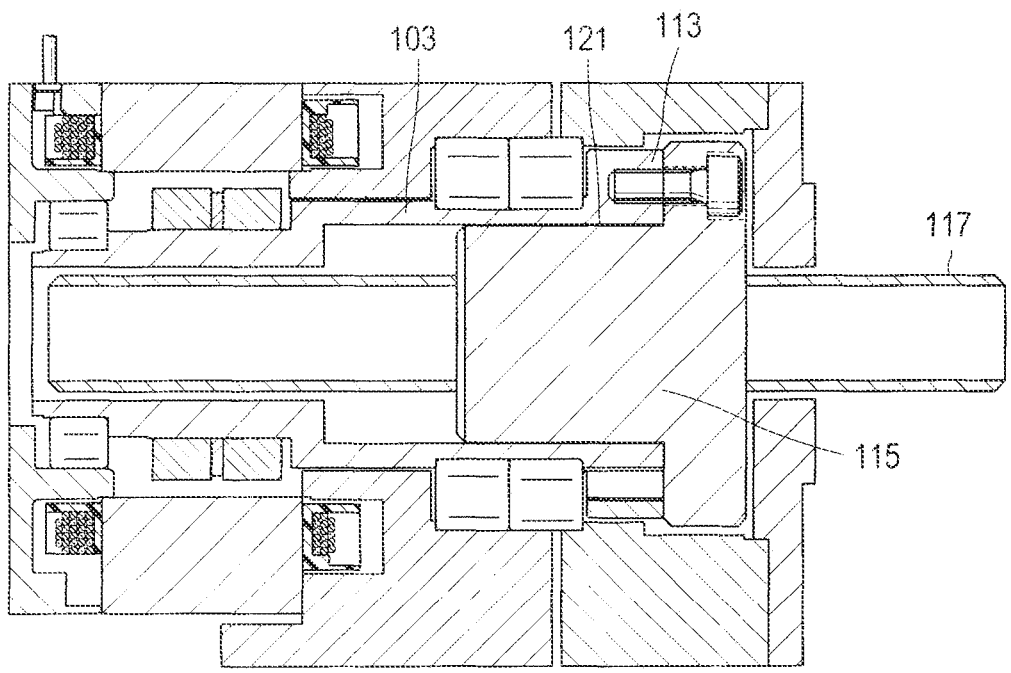
FIG. 3 is a view showing the structure of a linear actuator according to the related art.
Figure 4:
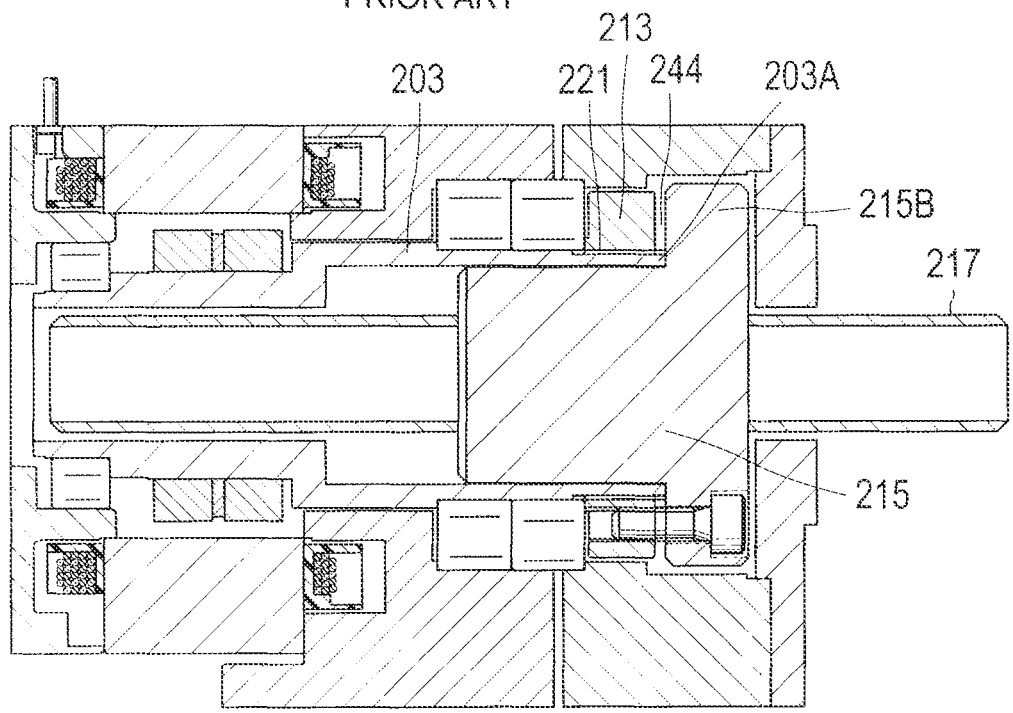
FIG. 4 is shows the structure of another linear actuator according to the related art.

In the linear actuator according to the embodiment, as shown in an enlarged view of FIG. 2, the respective sizes GD1 and GD2 of gaps formed at portions 33A and 33B between the outer peripheral portion of the large diameter portion 3G of the rotary shaft 3 and the inner wall portion 13A of the locknut 13, except the male thread portion 21 of the rotary shaft 3 and the female thread portion 23 of the locknut 13 threadably engaged with each other, are defined to prevent displacement between the center of rotation RC of the rotary shaft 3, the center of rotation of the locknut 13, and the center of rotation of the ball screw nut 15 when the ball screw nut 15 is fixed to the locknut 13 using the four screw members 25. That is, the respective sizes GD1 and GD2 of the gaps formed at the portions 33A and 33B are defined such that the respective centers of rotation of the locknut 13 and the ball screw nut 15 overlap the center of rotation RC of the rotary shaft 3.

Specifically, as shown in FIG. 2, a first cylindrical outer peripheral surface portion 35 and a second cylindrical outer peripheral surface portion 37 are formed on the outer peripheral portion of the large diameter portion 3G at the first end 3A of the rotary shaft 3 in addition to the male thread portion 21 threadably engaged with the locknut 13. The first cylindrical outer peripheral surface portion 35 is located closer to the thrust bearing 9 than the male thread portion 21 is. The second cylindrical outer peripheral surface portion 37 is smaller in diameter than the first cylindrical outer peripheral surface portion 35, and located opposite the first cylindrical outer peripheral surface portion 35 across the male thread portion 21. A first cylindrical inner peripheral surface portion 39 and a second cylindrical inner peripheral surface portion 41 are formed on the inner peripheral portion 13A of the locknut 13 in addition to the female thread portion 23 threadably engaged with the male thread portion 21 of the rotary shaft 3. The first cylindrical inner peripheral surface portion 39 faces the first cylindrical outer peripheral surface portion 35 with the male thread portion 21 and the female thread portion 23 threadably engaged with each other. The second cylindrical inner peripheral surface portion 41 is smaller in diameter than the first cylindrical inner peripheral surface portion 39, and faces the second cylindrical outer peripheral surface portion 37 with the male thread portion 21 and the female thread portion 23 threadably engaged with each other.

That is, the first cylindrical outer peripheral surface portion 35 formed on the rotary shaft 3 and the first cylindrical inner peripheral surface portion 39 formed on the locknut 13 form the portion 33A discussed above. Meanwhile, the second cylindrical outer peripheral surface portion 37 formed on the rotary shaft 3 and the second cylindrical inner peripheral surface portion 41 formed on the locknut 13 form the portion 33B discussed above.

In the embodiment, the size GD1 of the gap formed at the portion 33A between the first cylindrical outer peripheral surface portion 35 and the first cylindrical inner peripheral surface portion 39 and the size GD2 of the gap formed at the portion 33B between the second cylindrical outer peripheral surface portion 37 and the second cylindrical inner peripheral surface portion 41 are each defined to prevent displacement between the center of rotation RC of the rotary shaft 3, the center of rotation of the locknut 13, and the center of rotation of the ball screw nut 15 when the ball screw nut 15 is fixed to the locknut 13 using the plurality of screw members 25. That is, the respective sizes GD1 and GD2 of the gaps are defined such that the respective centers of rotation of the locknut 13 and the ball screw nut 15 overlap the center of rotation RC of the rotary shaft 3.

With the respective sizes GD1 and GD2 of the gaps defined as described above, displacement between the center of rotation RC of the rotary shaft 3 and the center of rotation of the locknut 13 can be prevented in a work process for threadably engaging the locknut 13 with the rotary shaft 3, with the portions 33A and 33B between the outer peripheral portion of the rotary shaft 3 and the inner wall portion 13A of the locknut 13, except the male thread portion 21 of the rotary shaft 3 and the female thread portion 23 of the locknut 13, serving as guides or features for engagement. Since the flange portion 15B of the ball screw nut 15 is fixed to the locknut 13 using the plurality of screw members 25 with the flange portion 15B of the ball screw nut 15 contacting the locknut 13, displacement between the center of rotation of the locknut 13 and the center of rotation of the ball screw nut 15 can be prevented. As a result, when the linear actuator according to the embodiment is used, it is possible to prevent the center of rotation of the ball screw 17 from being inclined with respect to the axis of the rotary shaft 3 without requiring a particularly high assembly precision. Further, the ball screw 17 can be reliably moved linearly with no displacement between the axis of the rotary shaft 3 and the center of rotation of the ball screw 17.

In the linear actuator according to the embodiment, as shown in FIG. 2, a gap 43 is formed between the first end 3A of the rotary shaft 3 and the flange portion 15B of the ball screw nut 15. That is, the flange portion 15B of the ball screw nut 15 is screwed to the locknut 13 such that the first end 3A of the rotary shaft 3 does not contact the flange portion 15B. Such a gap 43 can prevent the first end 3A of the rotary shaft 3 from being deformed or damaged by tightening the ball screw nut 15 in screwing the flange portion 15B to the locknut 13.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A linear actuator comprising:
   a motor portion that includes a cylindrical rotary shaft having a first end and a second end and including an opening portion at least at the first end in an axial direction of the rotary shaft, a rotor fixed to the rotary shaft, and a stator disposed outside the rotor;
   a first bearing portion that rotatably supports the first end of the rotary shaft;
   a second bearing portion that rotatably supports the second end of the rotary shaft;
   a locknut threadably engaged on the first end of the rotary shaft and contacting an inner race of the first bearing portion to block movement of the inner race of the first bearing portion in the axial direction; and
   a ball screw mechanism including a ball screw nut and a ball screw, the ball screw nut including a nut body fitted in the opening portion of the rotary shaft and a flange portion integrally formed with the nut body and located outside the opening portion, the ball screw nut being screwed to the locknut using a plurality of screw members with the flange portion contacting the locknut, and the ball screw being threadably engaged with the ball screw nut with part of the ball screw extending in the rotary shaft, wherein:
   a male thread portion is formed on an outer peripheral portion of the first end of the rotary shaft;
   a female thread portion is formed on an inner peripheral portion of the locknut to be threadably engaged with the male thread portion of the rotary shaft;
   a first cylindrical outer peripheral surface portion and a second cylindrical outer peripheral surface portion that are unthreaded and face radially outwardly relative to an axis of said rotary shaft, said first and second cylindrical outer peripheral surface portions being formed, together with the male thread portion that is threadably engaged with the locknut, on the outer peripheral portion at the first end of the rotary shaft, the first cylindrical outer peripheral surface portion being located closer to the first bearing portion than the male thread portion is, and the second cylindrical outer peripheral surface portion being smaller in diameter than the first cylindrical outer peripheral surface portion and being located opposite the first cylindrical outer peripheral surface portion across the male thread portion;
   a first cylindrical inner peripheral surface portion and a second cylindrical inner peripheral surface portion that are unthreaded and face radially inwardly relative to an axis of the locknut, said first and second cylindrical inner peripheral surface portions being formed, together with the female thread portion threadably engaged with the male thread portion of the rotary shaft, on the inner peripheral portion of the locknut, the first cylindrical inner peripheral surface portion facing the first cylindrical outer peripheral surface portion with the male thread portion and the female thread portion threadably engaged with each other, and the second cylindrical inner peripheral surface portion being smaller in diameter than the first cylindrical inner peripheral surface portion and facing the second cylindrical outer peripheral surface portion with the male thread portion and the female thread portion threadably engaged with each other;
   a first gap is formed between the first cylindrical outer peripheral surface portion and the first cylindrical inner peripheral surface portion and a second gap is formed between the second cylindrical outer peripheral surface portion and the second cylindrical inner peripheral surface portion; and
   a first distance between the first cylindrical outer peripheral surface portion and the first cylindrical inner peripheral surface portion and a second distance between the second cylindrical outer peripheral surface portion and the second cylindrical inner peripheral surface portion are selected so as to prevent displacement between the center of rotation of the rotary shaft, the center of rotation of the locknut, and the center of rotation of the ball screw nut when the ball screw nut is fixed to the locknut using the plurality of screw members.

2. The linear actuator according to claim 1, further comprising:
   a casing assembly for forming at least part of a casing for the motor portion and the ball screw mechanism, the casing assembly including a first end bracket to which the first bearing portion is fixed and which is configured to allow the ball screw to move in the axial direction, and a second end bracket to which the second bearing portion is fixed and which is configured to allow the second end of the rotary shaft to rotatably project from the second end bracket, the first and second end brackets facing each other in the axial direction.

3. The linear actuator according to claim 2, wherein a clearance is formed between the first end of the rotary shaft and the flange portion of the ball screw nut.

4. The linear actuator according to claim 1, wherein a clearance is formed between the first end of the rotary shaft and the flange portion of the ball screw nut.

* * * * *